March 29, 1966    E. G. GOLDSTONE    3,242,510
CUSHION OR PAD ASSEMBLY
Filed Nov. 20, 1961
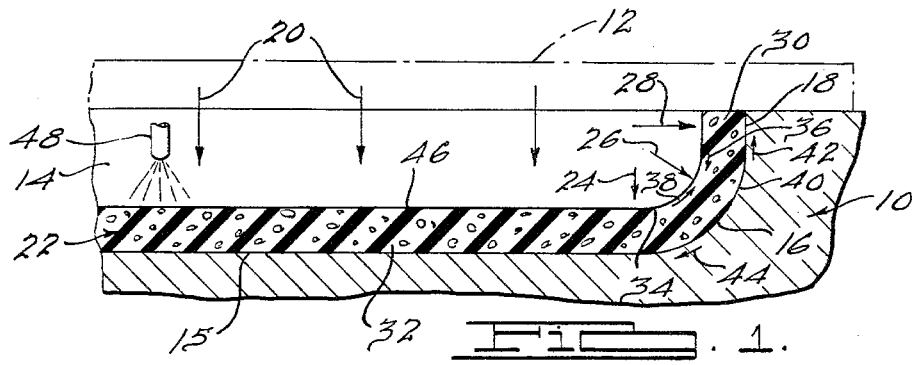
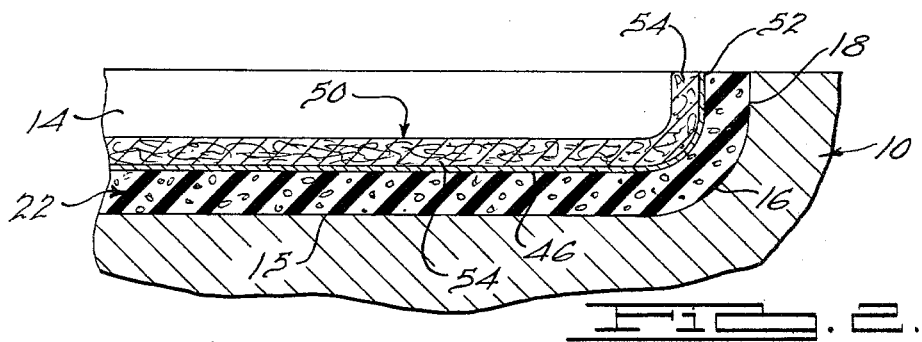
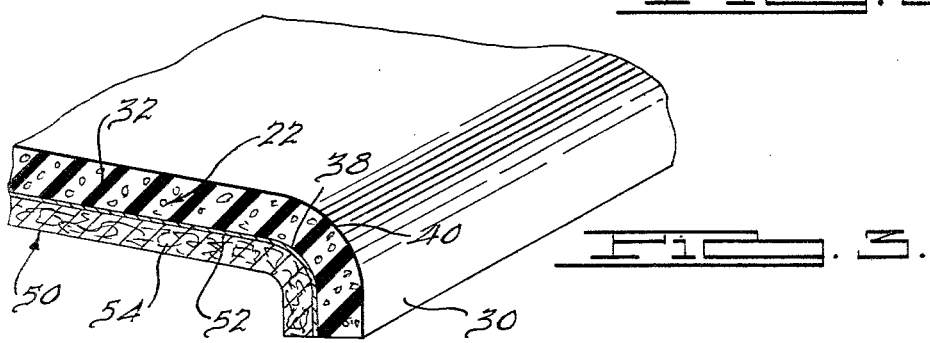
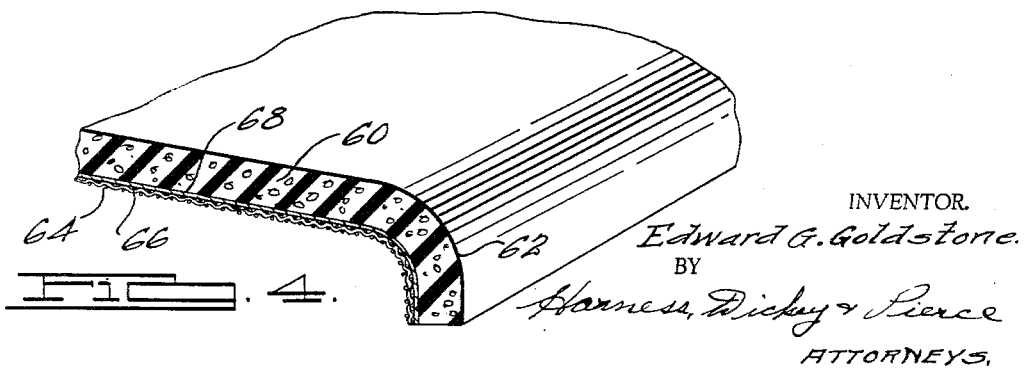
INVENTOR.
Edward G. Goldstone.
BY
Harness, Dickey & Pierce
ATTORNEYS.

United States Patent Office 3,242,510
Patented Mar. 29, 1966

3,242,510
CUSHION OR PAD ASSEMBLY
Edward G. Goldstone, Huntington Woods, Mich., assignor to Allen Industries, Inc., Detroit, Mich., a corporation of Delaware
Filed Nov. 20, 1961, Ser. No. 153,280
6 Claims. (Cl. 5—345)

This invention relates to the forming of resilient materials, and more particularly to a cushion assembly and the method of forming the same.

Many cushion assemblies used in home furnishings, vehicles, and the like, are conventionally made from resilient foam material. The most common foam materials used are foam rubber, vinyl foam, urethane foam and the like. Foam cushions are generally constructed with a particular configuration providing a contour for maximum comfort. The most common contour forms are similar to that found on seat cushions wherein an upper seating surface terminates at the front and sides of the cushion in downwardly curved portions which are adapted to extend downwardly around the associated seat support structure. For example, in the manufacture of seat cushions for automobiles, the front edge and, sometimes, the side edges of the foam cushion are downwardly curved at an angle of substantially 90° to provide a cavity within which seat spring elements are received. Conventional cushion structure is manufactured to the desired configuration by utilizing molds having molding cavities contoured to the desired configuration. Material is introduced into the molds and foamed therein to obtain foam cushions having the desired contour. The foamed material is thereby permanently set in the desired configuration. The die structure is elaborate and expensive. Furthermore, the manufacturing process is time-consuming and costly.

Accordingly, an object of this invention is to provide a new method of manufacturing foam cushions which is more economical than previous methods. Another object of the present invention is to provide a foam cushion which is constructed in a new and novel manner. A further object is to provide a method of forming foam cushions or the like to predetermined configurations from prefabricated foam material blanks. Other objects and advantages of the present invention will be apparent or become apparent by reference to the following detailed description and the accompanying drawings wherein:

FIGURE 1 is a side elevational view, in section, of a portion of a foam cushion in a preliminary manufacturing stage;

FIGURE 2 is another side elevational view in section, of a portion of the foam cushion of FIGURE 1 in a subsequent stage of manufacture;

FIGURE 3 is a perspective view, in section, of a portion of a foam cushion manufactured according to the principles of the present invention; and FIGURE 4 is a perspective view, in section, of an alternative embodiment of the present invention.

In general, the present invention provides foam cushion structure having a predetermined contour which is obtained by deforming prefabricated foam material into a desired configuration. Integral holding means are provided to permanently retain the deformed foam material in the desired configuration. Whereas in previous practice foam cushions have been manufactured by fabrication of the foam material within a mold or die having the desired contour; the present invention contemplates the use of prefabricated foam material blanks of similar basic design and contour. Accordingly, many manufacturing economies are obtained. For example, the foam material may be fabricated in large rectangular blocks in inexpensive dies within a minimum amount of fabricating time and expense. Foam cushion blanks may be cut from the large block of prefabricated foam material and thereafter formed to the desired configurations. Although the invention is particularly directed to the aforementioned types of foam materials, it is contemplated that the resilient materials such as resinated cotton, resinated jute, etc., may be formed in a similar manner.

Referring now to the drawings, a simplified die structure 10 is illustrated for forming a prefabricated foam blank 12 into a desired contour. The prefabricated foam blank may be rectangular in form and severed or sliced from a large prefabricated block of the material. The large prefabricated block may be formed to a size such that portions sliced therefrom will have the exact dimensions required to obtain a particular cushion structure during subsequent forming operations. The die is provided with a die cavity 14 defined by a bottom surface 15 and a curved side wall 16 which terminates in a flat portion 18. It is to be understood that the configurations of the die cavity may be varied to produce any desired configuration. For example, the bottom wall may be curved or undulating, and the side wall may extend around the entire periphery of the die cavity or some portion thereof.

The prefabricated blank of foam material is formed to the desired configuration by exerting a downward force in the direction of the arrows 20 to force the blank into the cavity. The blank is sufficiently oversize relative to the cavity 14 in the unstressed condition indicated at 12 to provide sufficient material to cover the entire peripheral surface of the cavity or as much as is desirable when the blank has been forced to the position indicated at 22. When the foam material has been forced into the die cavity and lies in abutting engagement with the lower surface 15, the end portions of the blank of material are forced into the curved section 16 of the die by the application of force along the direction of the arrows, 24, 26, 28. The blank of material may be positioned within the die cavity by automatic spreader mechanism or may be manually positioned therein and smoothed into the contour shown in FIGURE 1.

When the blank of material is in continual surface engagement with the periphery of the die cavity, the end portion 30 extends upwardly at substantially right angles to the plane of the main body portion 32. When the end portion 30 is bend upwardly, the inner peripheral surface 34 is contracted and compressive forces are set up therein as indicated by the arrows 36, 38. The outer peripheral surface 40 of the curved portion of the foam material is stretched and tensile forces are produced therein as indicated by the arrows 42, 44.

The surface of the foam material has relatively high frictional characteristics and is easily retained in the position shown in FIGURE 1 within the die cavity after the material has been spread into complete surface engagement therewithin. Consequently, the material retains the curved configuration without any necessity for continual application of force thereto within the die. However, if the material were to be removed from the die at this stage of the manufacture, it would, of course, return to its original flattened condition indicated at 12. In order to permanently secure the foam material in the distorted or deformed condition, as indicated at 22, a suitable adhesive bonding material is applied to the entire upper surface 46 of the foam material by any conventional means such as spray apparatus 48. Referring now to FIGURE 2, a backing material 50 of any suitable composition may be placed within the die cavity against the upper surface 46 of the foam material 22 and is spread over and into intimate engagement with the entire surface area thereof.

The backing material is permanently bonded in place by the adhesive bonding and forms a continual integral portion of the foam material 22. Any conventional seat cushion backing material may be utilized. In the illustrative embodiment, the backing material comprises a fibre covering 52 on the inner surface thereof and cotton padding 54 or the like, on the outer surface thereof. After the backing material has been spread over the periphery of and into intimate engagement with the upper surface 46, it may be held in place until the adhesive material fills the interstices of the covering 52 and is set to securely bond the backing material into permanent position on the foam unit 22. The set adhesive material forms a relatively nonstretchable, permanent, covering connecting the foam material and the backing material which will not be subsequently relatively displaced. A plastic film or coating may serve the purpose of permanently bonding the foam material in the deformed condition regardless of the backing material used. The only requirement is that the adhesive material and/or the backing material form a nonstretchable covering which is permanently bonded to the deformed foam material and will retain the foam material in the deformed condition.

When the foam material and the backing material are securely bonded to one another, the unit is removed from the die cavity and will retain the shape shown in FIGURE 3. The end portion 30 of the foam material will be permanently retained in the curved position shown and any other deformed portions of the material will be similarly retained. The material is retained in the curved deformed position because the adhesive material prevents return to the original unstressed condition. It may be seen that the inner surface 38 is permanently in compression and the outer surface 40 is permanently in tension. Consequently, the prefabricated foam material is permanently bonded into the desired configuration and may be mounted over a seat spring assembly or the like without further alteration.

Referring now to FIGURE 4, an alternative cushion structure is illustrated in which a prefabricated foam blank 60 having a curved section 62 is formed in the identical manner to that hereinbefore described. A woven material having transversely extending fibers 64, 66 which are intimately bonded to the inner surface 68 of the foam material has been substituted for the backing material 50. A suitable bonding material is used which will retain the curve portion 62 in the deformed position.

It should be apparent that the aforedescribed method of manufacture provides an improved seat cushion assembly which may be economically manufactured from a prefabricated blank of resilient material and which will retain a desired shape during use. Although a particular seat cushion construction has been described for illustrative purposes, it is to be understood that other seat cushion constructions utilizing other materials may be manufactured in a similar manner. The appended claims are intended to include equivalent modifications embodying the principles of the invention except insofar as limited by the prior art.

The invention claimed is:

1. A contoured seat cushion assembly comprising an uncontoured molded block of foam material having a normally unstressed condition, portions of said block of foam material being resiliently stressed to conform to a predetermined seat cushion contour, and a relatively nonstretchable covering permanently secured to said portions of said block of foam material to permanently retain said block of foam material in a contoured condition.

2. The invention as defined in claim 1 and wherein said covering comprises a spray coating of adhesive bonding material.

3. The invention as defined in claim 1 and wherein said covering comprises a plastic film integrally received on the surface of said block of foam material.

4. The invention as defined in claim 1 and wherein said covering comprises a fiber backing material, and adhesive bonding material securing said fiber backing material to said block of foam material.

5. A cushion assembly comprising only a block of prefabricated plastic foam material having an uncontoured and unstressed condition in an independent pre-assembly form, separate rigid nonstretchable backup means integrally bonded to only one of the side surfaces of said block of prefabricated plastic foam material, said separate rigid nonstretchable backup means permanently holding said block of prefabricated plastic foam material in a contoured and stressed condition in the assembly, and said block of prefabricated plastic foam material being resiliently held in the contoured and stressed condition by only said separate rigid nonstretchable backup means and all portions of said block of prefabricated plastic foam material being capable of compression under application of stress and of returning to said contoured and stressed condition upon removal of the stress exerted thereon.

6. A cushion assembly comprising a block of resiliently compressible plastic foam material normally assuming an unstressed uncontoured expanded condition and being capable of resiliently deflection under load to assume a stressed contoured condition without permanent deformation, a nonstretchable backing material fixedly mounted on one surface of said block of resilient foam material and having a fixed curved contour, said block of resilient foam material being rigidly attached to said nonstretchable backing material and assuming the curved contour of said nonstretched backing material without permanent deformation and being resiliently held in a corresponding curved contour by said nonstretchcable backing material, and said block of resilient foam material having an expanded condition throughout after attachment to said nonstretchable backing material and being resiliently compressible throughout.

References Cited by the Examiner

UNITED STATES PATENTS

| | | | |
|---|---|---|---|
| 2,232,646 | 2/1941 | Stone et al. | 5—361 |
| 2,239,457 | 4/1941 | Gibbons | 5—361 |
| 2,606,598 | 8/1952 | Smith | 248—350 |
| 2,744,340 | 5/1956 | Gerber | 36—11.5 |
| 2,785,407 | 3/1957 | Reeder | 2—22 |
| 2,866,497 | 12/1958 | Struthers | 5—361 |
| 2,878,153 | 3/1959 | Hacklander | 5—361 X |
| 2,915,427 | 12/1959 | Schriner et al. | 156—214 |
| 2,991,212 | 7/1961 | Cotterman et al. | 156—214 |

FRANK B. SHERRY, *Primary Examiner.*

GEORGE L. BREHM, *Examiner.*

A. M. CALVERT, *Assistant Examiner.*